United States Patent
Maes et al.

(10) Patent No.: US 9,313,038 B2
(45) Date of Patent: Apr. 12, 2016

(54) POINT-TO-MULTI-POINT TRANSMISSION OVER A WIRED LOOP PLANT

(75) Inventors: Jochen Maes, Veerle (BE); Koen Hooghe, Berchem (BE)

(73) Assignee: Alcatel Lucent, Boulogne-Billancourt (FR)

( * ) Notice: Subject to any disclaimer, the term of this patent is extended or adjusted under 35 U.S.C. 154(b) by 176 days.

(21) Appl. No.: 14/117,954

(22) PCT Filed: Jun. 4, 2012

(86) PCT No.: PCT/EP2012/060475
§ 371 (c)(1),
(2), (4) Date: Nov. 25, 2013

(87) PCT Pub. No.: WO2012/171820
PCT Pub. Date: Dec. 20, 2012

(65) Prior Publication Data
US 2014/0092903 A1  Apr. 3, 2014

(30) Foreign Application Priority Data

Jun. 14, 2011  (EP) .................................. 11305742

(51) Int. Cl.
*H04L 12/18*  (2006.01)
*H04B 3/00*  (2006.01)
(Continued)

(52) U.S. Cl.
CPC  *H04L 12/18* (2013.01); *H04B 3/00* (2013.01); *H04J 3/02* (2013.01); *H04Q 11/04* (2013.01);
(Continued)

(58) Field of Classification Search
CPC ............ H04L 12/2861; H04L 12/2867; H04L 12/2869; H04L 12/18; H04M 3/007; H04J 3/02; H04B 3/00; H04Q 11/04; H04Q 2213/13242
See application file for complete search history.

(56) References Cited

U.S. PATENT DOCUMENTS 5,872,809 A * 2/1999 Batruni .......................... 375/219
6,279,139 B1 * 8/2001 Miyasita ....................... 714/801
(Continued)

FOREIGN PATENT DOCUMENTS

CN  1881912 A  12/2006
EP  2369781 A1  9/2011
(Continued)

OTHER PUBLICATIONS

International Search Report PCT/ISA/210 for PCT/EP2012/060475 dated Jun. 28, 2012.
(Continued)

*Primary Examiner* — Sophia Vlahos
(74) *Attorney, Agent, or Firm* — Harness, Dickey & Pierce, P.L.C.

(57) ABSTRACT

The access node includes first transmit/receive circuitry with digital signal processing logic and digital-to-analog/analog-to-digital conversion logic, and second transmit/receive circuitry with transmit/receive amplifiers and line adaptation units for connection to a transmission line. The access node further includes an analog switch for dynamically connecting one of the first transmit/receive circuitry with one of the second transmit/receive circuitry according to a transmit/receive cross-connect table, and transmit/receive control logic for updating the transmit cross-connect table according to a transmit/receive traffic pattern over the respective transmission lines.

11 Claims, 3 Drawing Sheets

(51) Int. Cl.
*H04Q 11/04* (2006.01)
*H04J 3/02* (2006.01)

(52) U.S. Cl.
CPC .............. *H04Q 2213/13034* (2013.01); *H04Q 2213/13107* (2013.01); *H04Q 2213/13242* (2013.01); *H04Q 2213/13396* (2013.01)

(56) References Cited

U.S. PATENT DOCUMENTS

| | | | |
|---|---|---|---|
| 6,370,187 | B1 | 4/2002 | Agah |
| 6,771,740 | B1 * | 8/2004 | Bingel ................ 379/26.01 |
| 7,414,995 | B1 | 8/2008 | Melkote et al. |
| 7,490,345 | B2 * | 2/2009 | Rakib et al. ................ 725/111 |
| 8,861,554 | B1 * | 10/2014 | Schneider et al. ............ 370/546 |
| 2006/0023756 | A1 * | 2/2006 | Meier ..................... 370/537 |
| 2011/0085647 | A1 | 4/2011 | Hicks, III |

FOREIGN PATENT DOCUMENTS

| | | | |
|---|---|---|---|
| JP | 56098991 | A | 8/1981 |
| JP | 57078295 | A | 5/1982 |
| JP | 59083493 | A | 5/1984 |
| JP | 59112793 | A | 6/1984 |
| JP | 10075279 | A | 3/1998 |
| JP | 10336711 | A | 12/1998 |
| JP | 2000004271 | A | 1/2000 |
| JP | 2001078239 | A | 3/2001 |
| JP | 2003018319 | A | 1/2003 |

OTHER PUBLICATIONS

Written Opinion PCT/ISA/237 for PCT/EP2012/060475 dated Jun. 28, 2012.
Office Action for corresponding Japanese Application No. 2014-515130 dated Jan. 27, 2015 and English translation thereof.

* cited by examiner

POINT-TO-MULTI-POINT TRANSMISSION OVER A WIRED LOOP PLANT

CROSS-REFERENCE TO RELATED APPLICATIONS

This application is the national phase under 35 U.S.C. §371 of PCT International Application No. PCT/EP2012/060475 which has an International filing date of Jun. 4, 2012, which claims priority to European patent application number 11305742.6 filed Jun. 14, 2011; the entire contents of each of which are hereby incorporated by reference.

TECHNICAL FIELD OF THE INVENTION

The present invention relates to next generation copper access, and more specifically to access nodes with point-to-multi-point transmission capabilities.

TECHNICAL BACKGROUND OF THE INVENTION

For next generation copper access, interest has been expressed in allowing Point-To-Multi-Point (P2MP) protocols. This has the claimed advantage that N users can be served from a single transceiver in the access node, with positive impact on cost, size, energy consumption and scalability of the access node.

However, copper loop plants generally consist of dedicated (or point-to-point) links from the access node to the respective subscriber premises. Physically, the copper twisted pair is not shared among multiple users. Applying P2MP to such network is therefore untraditional. This is very inefficient in terms of transmit power. Moreover, the desire for reverse power feeding from customer premises and for Plain Old Telephony Service (POTS) add further obstacles for efficient implementation of P2MP access networks.

In a traditional P2MP topology, the transmit signal is divided at every branching. Consider a star topology with N branches for connecting to N users. The transmit power P is divided into N equivalent signals with power P/N in each of the N branches. Without loss of generality we omit here the fact that in practice, the signal powers on different branches can differ if their impedances differ. Typically, Digital Subscriber Line (DSL) standards as well as other access or in-home standards define maximum transmit Power Spectral Densities (PSD) that can be put on a line. In a star topology, the PSD limitation will be enforced by the first segment that connects the transmitter to the N branches of the star. Thus each branch sees a PSD much lower than the imposed PSD that depends on the impedances of the different loops. Disregarding the different channel characteristics of the branches, the transmit power is allowed to be a factor of N larger than dictated by the PSD limitation, as the power will be split over the N subscriber loops. Thus the front end hardware needs to be able to transmit at very high powers, a factor of N higher than traditionally, which in turn imposes hard requirements on the performance and linearity of components such as the line driver. Also, it is incompatible with the power budget constraints due to the reverse power feeding requirement. The straightforward alternative is to base the front end on current design and accept the hit in received power of a factor of N. Typically, N is in the order of 8 to 24. This corresponds to a signal-to-Noise Ratio (SNR) reduction in the order of 9 to 14 dB. An example of such state of the art implementation is a Wilkinson power divider.

SUMMARY OF THE INVENTION

It is an object of the present invention to provide an original arrangement for support of P2MP transmission within an access node that is efficient both in terms of consumed power and individual data throughput available to each and every user.

In accordance with a first aspect of the invention, an access node for connecting subscribers via a wired loop plant comprises a first transmit circuitry comprising transmit digital processing logic for outputting transmit digital samples serially coupled with digital-to-analog conversion logic for converting the transmit digital samples into an analog transmit signal serially coupled with a first transmit output port, and a plurality of second transmit circuitries individually comprising a second transmit input port serially coupled with a transmit amplifier for amplifying a transmit signal serially coupled with a line adaptation unit for connection to a transmission line of the wired loop plant and for adaptation to line physical characteristics of the transmission line.

The access node further comprises a transmit analog switch comprising a third transmit input port coupled to the first transmit output port, and third transmit output ports coupled to respective ones of the second transmit input ports, and configured to dynamically connect the third transmit input port to one of the third transmit output ports according to a transmit cross-connect table, and transmit control logic coupled to the transmit analog switch and configured to update the transmit cross-connect table according to a transmit traffic pattern over the respective transmission lines.

In accordance with another aspect of the invention, an access node for connecting subscribers via a wired loop plant comprises a first receive circuitry comprising a first receive input port serially coupled with analog-to-digital conversion logic for converting a receive analog signal into receive digital samples serially coupled with receive digital processing logic for processing the receive digital samples, and a plurality of second receive circuitries individually comprising a line adaptation unit for connection to a transmission line of the wired loop plant and for adaptation to line physical characteristics of the transmission line serially coupled with a receive amplifier for amplifying a receive signal serially coupled with a second receive output port.

The access node further comprises a receive analog switch comprising third receive input ports coupled to respective ones of the second receive output ports, and a third receive output port coupled to the first receive input port, and configured to dynamically connect one of the third receive input ports to the third receive output port according to a receive cross-connect table, and receive control logic coupled to the receive analog switch and configured to update the receive cross-connect table according to a receive traffic pattern over the respective transmission lines.

In one embodiment of the invention, the transmit and/or receive traffic pattern conforms to a Time-Division Multiple Access TDMA scheme.

In one embodiment of the invention, the transmit and/or receive traffic pattern is determined according to transmit and/or receive traffic demands over the respective transmission lines.

In one embodiment of the invention, the transmit control logic is further for individually disabling or enabling the transmit and/or receive amplifiers concomitantly with the updating of the transmit and/or receive cross-connect table.

In one embodiment of the invention, the first transmit circuitry comprises a transmit filter serially coupled between the digital-to-analog conversion logic and the first output port for confining transmit signal energy into a transmit frequency band.

In one embodiment of the invention, the first receive circuitry comprises a receive filter serially coupled between the first receive input port and the analog-to-digital conversion logic for confining receive signal energy into a receive frequency band.

In one embodiment of the invention, the cross-connect tables of the transmit and receive switches are updated independently from each other.

The drawbacks of P2MP transmission over a wired loop plant are circumvented by introducing a switch between the transmitter and the links. The position of the switch is carefully designed to optimize power consumption and individual data throughputs, and minimize implementation difficulties. The solution includes a switching function to allow allocation of any lines to any one of multiple transceivers.

While different options exist, an attractive design has been identified. It involves including a switching function before the transmit and receive amplifier stage, possibly with inclusion of a control logic for disabling or enabling the transmit and receive amplifiers concomitantly with the update of the cross-connect table for additional energy efficiency.

The switch is driven based on a Time Division Multiple Access (TDMA) scheme, or on transmit or receive actual traffic demands over the respective transmission lines.

This original arrangement allows the line driver and hybrid settings to be optimized per line, while a single digital transceiver, including the Digital-to-Analog Converter (DAC) and the Analog-to-Digital Converter (ADC), and possibly a transmit and receive filter too, is shared among multiple users.

Such an arrangement typically forms part of a line termination unit, which is a piece of equipment whereat transmission lines from subscriber premises terminate. This piece of equipment forms part of an access node for providing network access to subscribers. Examples of access nodes are a Digital Subscriber Line Access Multiplexer (DSLAM), an Ethernet access bridge, an IP access or edge router, etc. The access node may reside at a central location (e.g., a central office), or at a remote location closer to subscriber premises (e.g., a street cabinet)

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
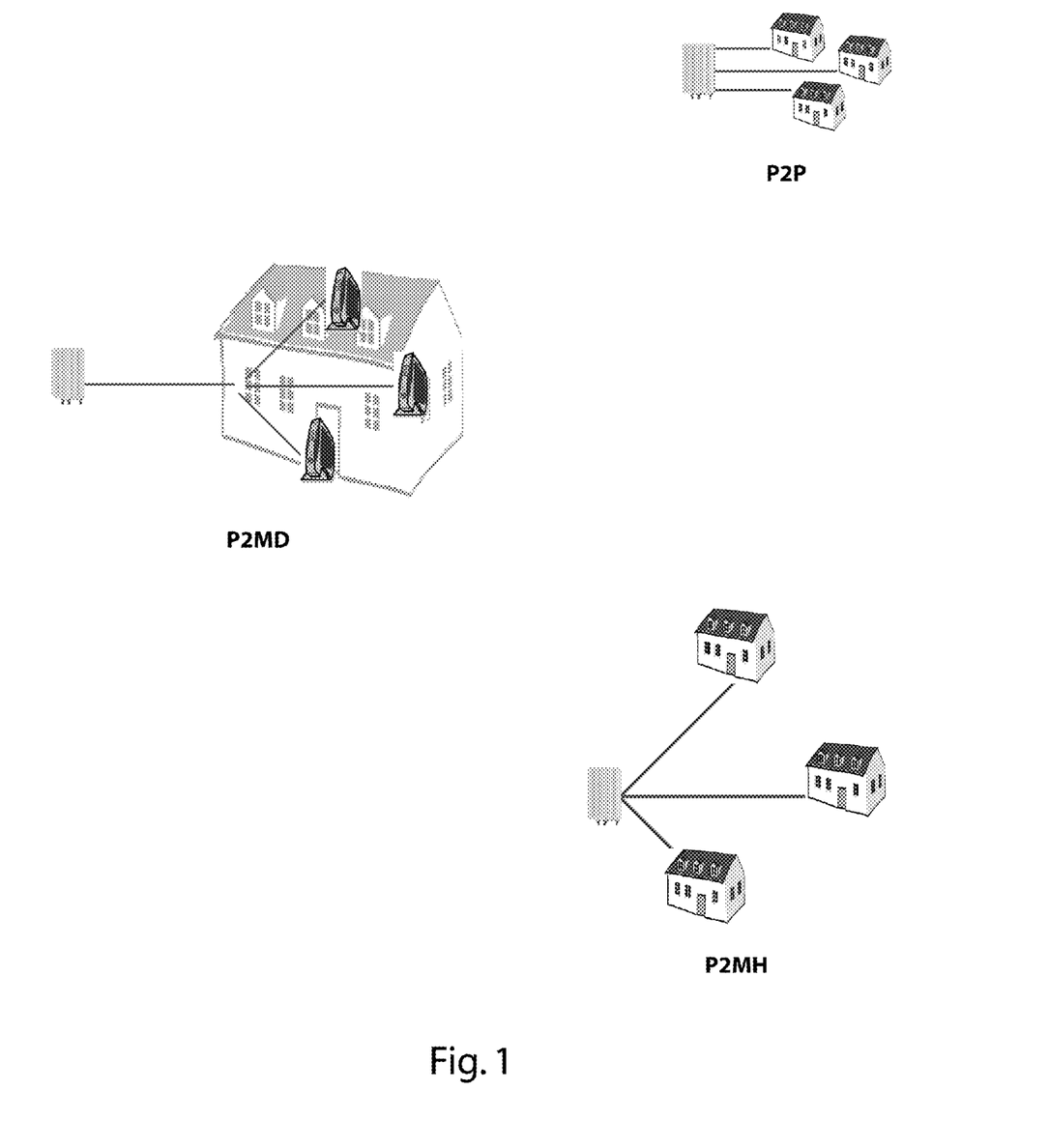
FIG. 1 represents different access topologies for current and next generation copper-access.

There is seen in FIG. 1 three access topologies: Point-to-Point (P2P), Point-to-Multi-Devices (P2MD), and Point-to-Multi-Home (P2MH).

[P2P] In the P2P use case, each subscriber is connected to a dedicated transceiver in the access node. Each subscriber has a single access network termination. This is the traditional approach in DSL (FIG. 1, top).

The advantage of this scheme is that each subscriber has its dedicated channel. This maximizes the capacity available for each subscriber and reduces the inter-dependencies between neighboring users. There is also a clear separation between the access and the in-home network, which allows a clear separation of management responsibilities.

One disadvantage is that a dedicated transceiver is required per end-user, with implications on access node size. Crosstalk is also a major issue. Crosstalk cancellation techniques, such as joint signal processing, can palliate this shortcoming.

Another disadvantage is that each subscriber needs a single gateway that separates the access and the in-home networks. On the other hand, the access capacity is always available regardless of any in-home traffic.

[P2MD] In the P2MD use case, each subscriber is connected to a dedicated transceiver in the access node. The subscriber may have multiple access network termination equipment inside his home, each connected to a different branch of the incoming twisted pair (FIG. 1, center).

One advantage of this scenario is that any connection inside the home can be used to terminate the access network, and multiple terminations can operate simultaneously. This allows the removal of the in-home gateway. Each service is terminated near its end-device: High-Speed Internet Access (HSIA) near (or inside) the PC, and IPTV near (or inside) the TV.

Another advantage is that the in-home devices could use the same technology and topology for inter-device communication within the home (i.e., not via the access node transceiver). This corresponds to a merging of the access and in-home network.

It comes with a drawback that the capacity for communication between the access node and the end-devices reduces when in-home traffic is sent over the same network.

Another disadvantage is that stubs are inherently present. Many operators see in-home bridged taps as a major bottle neck due to the reduction in capacity caused by dips in the channel response and increased noise pick-up. Moreover, the type of noise picked up in a tap is often time varying (impulse noise, AM ingress). In P2MD, bridged taps are tolerated or even intentionally added in order to increase flexibility. This will affect the overall link capacity.

Also, crosstalk remains still a major impairment with P2MD.

[P2MH] In the P2MH use case, each subscriber has a single gateway. one transceiver at the access node is connected to multiple transceivers at separate customer premises, one transceiver per subscriber (FIG. 1, bottom).

One advantage of this use case is that a single transceiver at the access node may serve M multiple subscribers. An access node with N transceivers would be capable of serving M×N subscribers. This may be useful in case the number of potential subscribers is larger than the maximum available or affordable number of transceivers in a single node.

Another advantage is that crosstalk can be avoided in P2MD transmission (with clear capacity hit) by assigning orthogonal time slots to mutual crosstalkers.

A disadvantage is that P2MH turns the DSL access into a shared medium. While each subscriber physically has one or more dedicated pairs, a P2MH MAC implies that neighboring subscribers would still need to time-share or frequency-share their bandwidth. This will reduce the average bandwidth available to each subscriber with a factor of $m(t)$, where m is the number of subscribers active at time t. Thus there is a clear time dependency on the available bandwidth. This is acceptable as long as the demand for throughput is sufficiently below the single link capacity, i.e. for initial deployments. But when demand rises, medium-sharing will become less attractive. When this occurs, operators can choose to rewire or replace their equipment such that each subscriber has a dedicated transceiver. This does require a truck-roll.

Another disadvantage is that a metallic contact between the twisted pairs makes that the power transmitted at the access node will be divided into the M lines. In case of M lines with equal properties and length, the required transmit power would be M times larger than in case of P2P.

Therefore, a more complex solution is required involving multiple LDs/LNAs, each connected to a dedicated pair, that receive their signals from a single DAC/ADC. A switch is required between the DAC/ADC and the set of line drivers/amplifiers. The multiplication of the number of line drivers and amplifiers allows to still tune the front-end settings per line. This is important in order to limit further capacity reduction due to the need for generic front-end settings. Also, such a scheme can still handle POTS or reverse power feed per line.

Figure 2:
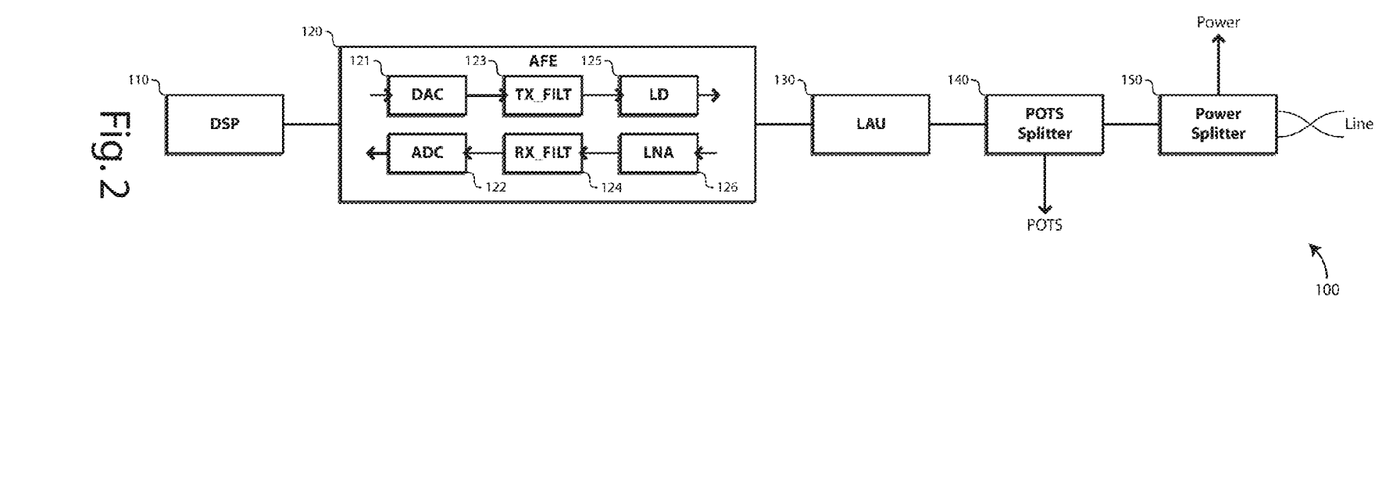
FIG. 2 represents the functional architecture of a typical digital transceiver.

There is seen in FIG. 2 a high-level block diagram of a transceiver arrangement 100. The transceiver arrangement 100 is shown as comprising the following functional blocks serially coupled to each other:
Digital Signal Processor 110 (or DSP),
an Analog Front End 120 (or AFE),
a Line Adaptation Unit 130 (or LAU),
a POTS splitter 140,
a power splitter 150.

The DSP 110 is for encoding and modulating user and control data into digital data symbols, and for de-modulating and decoding user and control data from digital data symbols.

In a preferred embodiment, the DSP 110 encodes and decodes Discrete Multi-Tone (DMT) data symbols over multiple orthogonal carriers (also known as Orthogonal Frequency Division Multiplexing (OFDM) communication), but other digital communication techniques are deemed to be encompassed as well.

The following transmit steps are typically performed within the DSP 110:
data encoding, such as data multiplexing, framing, scrambling, error correction encoding and interleaving,
signal modulation, comprising the steps of ordering the carriers according to a carrier ordering table, parsing the encoded bit stream according to the bit loadings of the ordered carriers, and mapping each chunk of bits onto an appropriate transmit constellation point (with respective carrier amplitude and phase),
signal scaling,
Inverse Fast Fourier Transform (IFFT)
Cyclic Prefix (CP) insertion, and
time-windowing.

The following receive steps are typically performed within the DSP 110:
time-domain signal equalization,
Cyclic Prefix (CP) removal,
Fast Fourier Transform (FFT),
frequency-domain signal equalization,
signal de-modulation and detection, comprising the steps of applying to each and every equalized frequency sample an appropriate constellation grid, the pattern of which depends on the respective carrier bit loading, detecting the expected transmit constellation point and the corresponding transmit bit sequence, and re-ordering all the detected chunks of bits according to the carrier ordering table,
data decoding, such as data de-interleaving, RS decoding (byte errors, if any, are corrected during this step), de-scrambling, frame delineation and de-multiplexing.

The AFE 120 comprises a Digital-to-Analog Converter 121 (or DAC) and an Analog-to-Digital Converter 122 (or ADC), a transmit filter 123 (or TX_FILT) and a receive filter 124 (or RX_FILT) for confining the signal energy within the appropriate communication frequency bands while rejecting out-of-band interferences, a line driver 125 (or LD) for amplifying the transmit signal and for driving the transmission line, and a Low Noise Amplifier 126 (LNA) for amplifying the receive signal with as little noise as possible.

The LAU 130 comprises a hybrid for coupling the transmitter output to the transmission line and the transmission line to the receiver input while achieving low transmitter-receiver coupling ratio (e.g., by means of echo cancellation techniques), further transmit and receive high-pass filters for filtering out any unwanted signals present in the POTS and power frequency bands, impedance-matching circuitry for adapting to the characteristic impedance of the line, and isolation circuitry (typically a transformer).

The POTS splitter 140 and the power splitter 150 are for picking up the POTS and power signals respectively. The POTS splitter 140 and/or the power splitter 150 are optional: they are present if there is a need for legacy voice-grade service and for reverse power feeding respectively. The order of the POTS and power splitter blocks is arbitrary. The depicted order corresponds to a situation where the power is transferred at DC, while the DC POTS signaling is converted to recognizable AC signaling at the POTS splitter block.

We now move through the block diagram from right to left and indicate pros and cons of locating a switch at that location.

In order to be able to draw power from each end user, even if there is temporarily no transmission on this line, the switch needs to be located left from the power splitter 150. This is crucial if the power from a single end-user is not sufficient to power all (remote) access node functionalities, e.g. because too much power is required or because the power transfer on that line is faulty.

Similarly, in order to enable POTS service for all end-users simultaneously, it is important that the switch is located left of the POTS splitter 140.

For compactness of the design, the switch could be located between the LAU 130 and the POTS splitter 140. Only a single LAU is needed to serve the N lines. In this architecture, the LAU, AFE and DSP are shared among the end-users. This implies that either generic line-adaptation settings are required that apply to all lines, or that the LAU configuration needs to be changed synchronously with the switch's cross-connect table. Such change would typically cause undesirable transient effects. This leaves generic line-adaptation settings as the preferred option for this switch location.

Moving further left in the block diagram, the switch can be located between the AFE 120 and the LAU 130. This has the advantage that the AFE is shared among the N users. This is important because the AFE is by far the largest consumer of energy in this chain. Another advantage is that each line has its own optimized LAU. This advantage must be rationalized: since all loops are expected to be from the same cable type, the line-adaptation settings of the different lines will be similar. A disadvantage of this approach is that the AFE and the LAU are today co-optimized. It is hard to untangle the AFE and the LAU and remain equally efficient as today.

The next option considered is to locate the switch between the DSP 110 and the AFE 120. This is by far the easiest implementation, as the signals are still in the digital domain. Also, AFE settings are optimized by line. However, the fact that each line has its own AFE causes space and energy consumption issues: the AFE is the largest energy consumer of the block. Switching on or of the entire AFE for saving power when the transceiver is toggling through the lines in TDMA mode will cause transient effects. More specifically, due to latency requirements on the line, there will not be a long period of inactivity of a given line (except if the line is in idle mode). The switching ratio is understood to be too high to enable significant energy savings in the AFE.

Let's now focus on the AFE to optimize energy efficiency in the switching procedure. The digital part of the AFE includes everything up to the DAC and from the ADC. In the AFE analog part, there typically are transmit and receive filters for confining energy within the downstream and upstream frequency bands respectively, as well as the LDs and LNAs for signal amplification. The DACs and ADCs, as well as the filter characteristics, are assumed to be fixed, or at least similar for the different lines. The gain control in the LD and LNA are preferentially adapted, notably if the loop lengths differ significantly. A suitable location for a switch would therefore be within the AFE between the Tx/Rx filters and the LD/LNA. In this design, the DSP and the AFE up to and including the filters are shared amongst the users connected by P2MP. Each line has its dedicated LD/LNA, LAU, and POTS and power splitters. This allows co-optimization of LD/LNA and LAU as usual. Also, the LD/LNA naturally scale power with activity. The LD characteristics are well known and observe a quiescent energy consumption. Banking on this design, it is of importance to select LDs with low quiescent consumption, as the LDs may be inactive for (N−1)/N of the time. Further advantages of this design are that it enables transmission on one line while simultaneously receiving on another, creating further flexibility in the TDMA schemes and US/DS ratios.

Figure 3:
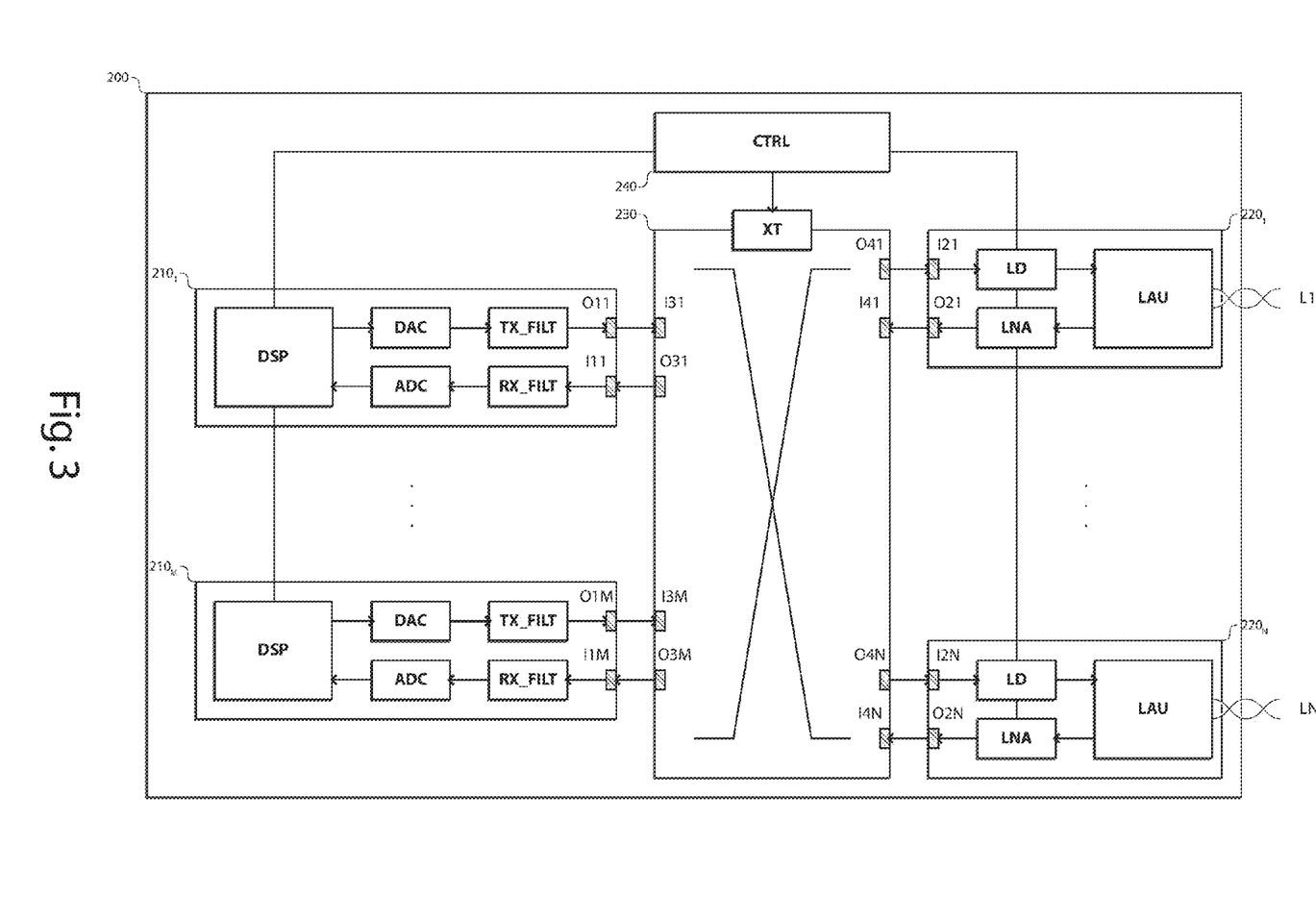
FIG. 3 represents an access node comprising an energy-efficient transceiver arrangement for P2MP transmission.

The proposed arrangement is depicted in FIG. 3. There is seen in FIG. 3 an access node 200 comprising the following functional blocks:

M first transceiver circuitries 210$m$,
N second transceiver circuitries 220$n$,
a switch 230, and
a controller 240 (or CTRL).

M and N are positive integers with M substantially lower than N so as to achieve high resource sharing and reduced costs; m and n are indexes ranging from 1 to M and 1 to N respectively.

Each first transceiver circuitry 210$m$ comprises a transmit output port O1$m$ and a receive input port I1$m$. Each first transceiver circuitry 210$m$ comprises a first transmit circuitry coupled to the transmit output port O1$m$, and a first receive circuitry coupled to the receive input port I1$m$. The first transmit circuitry comprises a DSP, a DAC and a transmit filter serially coupled to each other, and the first receive circuitry comprises a receive filter, an ADC and the DSP serially coupled to each other. The receive and transmit filter blocks are optional. A further extrapolation/decimation block can be present between the DSP block and the DAC/ADC block.

Each second transceiver circuitry 220$n$ comprises a transmit input port I2$n$ and a receive output port O2$n$. Each second transceiver circuitry 220$n$ comprises a second transmit circuitry coupled to the transmit input port I2$n$, and a second receive circuitry coupled to the receive output port O2$n$. The second transmit circuitry comprises a LD serially coupled to a LAU, and the second receive circuitry comprises the LAU serially coupled to a LNA. The LAU is further coupled to a transmission line of the wired loop plant.

The switch 230 is an analog switch comprising m transmit input ports I3$m$ coupled to respective ones of the m transmit output ports O1$m$, m receive output ports O3$m$ coupled to respective ones of the m receive input ports I1$m$, n transmit output ports O4$n$ coupled to respective ones of the n transmit input ports I2$n$, and n receive input ports I4$n$ coupled to respective ones of the n receive output ports O2$n$. The input and output ports are usually combined as bi-directional ports.

The switch 230 is an analog switch configured to propagate an analog signal received through a particular input port towards a particular output port that is in one-to-one relationship with the particular input port. This can be achieved by means of Micro Electro-Mechanical (MEM) switches, Field Effect Transistors (FET), or alike elementary switching devices. The one-to-one association between a particular input port and a particular output port is held in a cross-connect table XT that is dynamically updated by the controller 240.

The controller 240 is coupled to the DSPs, the LDs, the LNAs and the switch 230.

The controller 240 is for dynamically updating the cross-connect table of the switch 230 according to a transmit and receive traffic pattern. Each one of the first transceiver circuitries 210 is first configured as being statically or semi-statically assigned to a number of lines ranging from zero to N. If the number of lines is greater than or equal to 2, then a multiple access scheme is used. Next, within this particular group of lines, a first transmit path is dynamically set-up through the switch 230 to connect a first transmit circuitry to a second transmit circuitry, and a second receive path is dynamically set-up through the switch 230 to connect the first receive circuitry to the same or another second receive circuitry.

The receive and transmit paths are dynamically set-up following some pre-determined TDMA scheme, or according to the actual traffic demands, including user fairness considerations while allocating resources. The actual traffic demand can be determined according to traffic information as per to/from which subscriber traffic is to be expected. For instance, the DSP can report the identity of the line over which the next downstream data symbol(s) is to be transmitted to the controller 240, and the controller 240 can authorize the actual transmission of the data symbol once the switch 230 has been appropriately programmed. Then, it is up to the DSP to prioritize and fairly dispatch downstream traffic over the respective subscriber lines. Still for instance, the LNA can detect some receive signal from a Customer Premises Equipment (CPE) that is indicative of a demand for upstream communication and inform the controller 240 accordingly. Once a particular user has been selected for upstream communication, the corresponding receive path is programmed through the switch 230, and some kind of acknowledgment signal is sent over the corresponding transmission line so as the CPE can start transmitting upstream. This acknowledgment signal can be some programmable or generic signal issued by the LD directly without making use of the first transmit resources, which can be advantageously used over a different transmission line.

Alternatively, a low-complex receive power detector is coupled to the switch 230, and the controller 240 connects the receive power detector consecutively through all the inactive lines. In this way, only a single power detector is needed, and random access can be detected on a first line while upstream communication takes place on a second line.

The controller 240 is further configured to switch a LD into a low-power quiescent mode (typically making use of a biasing with lower quiescent current and reduced linearity) if the LD is connected to none of the first transmit circuitries, meaning if there is no active transmit path through the switch 230 for that LD; the controller 240 is further configured to switch the LD back into operation with nominal power consumption (typically making use of another biasing with higher quiescent current and improved linearity) if the LD is connected to one first transmit circuitry, meaning if there is an active transmit path through the switch 230 for that LD.

Similarly, the controller 240 is further configured to switch a LNA into a low-power quiescent mode if the LNA is connected to none of the first receive circuitries, meaning if there is no active receive path through the switch 230 for that LNA; the controller 240 is further configured to switch the LNA back into operation with nominal power consumption if the LNA is connected to one first transmit circuitry, meaning if the corresponding receive path is active through the switch 230 for that LNA; note that the LNA shall always or intermittently remain on if random access signals from CPE are to be detected Alternatively, the amplifier control logic could be implicit and based on signal detection at the input of the LD and/or the LNA.

Multicast transmission is achieved by simultaneously cross-connecting multiple second transmit circuitries to a single first transmit circuitry. This is useful, e.g. when multiple lines that are in idle mode require a training signal for maintaining synchronization. A single first transmit circuitry can provide such training signal to multiple second transmit circuitries simultaneously, freeing up the other first transmit circuitries for the remaining active second transmit circuitries. During multicast transmission, the line driver amplification may be adapted to overcome the power division over multiple paths. Alternatively, synchronization is maintained by a generic or programmable signal issued by the second circuitry and not involving a first circuitry.

It is to be noticed that the term 'comprising' should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled' should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, digital signal processor (DSP) hardware, network processor, application specific integrated circuit (ASIC), field programmable gate array (FPGA), etc. Other hardware, conventional and/or custom, such as read only memory (ROM), random access memory (RAM), and non volatile storage, may also be included.

The invention claimed is:

1. An access node for connecting subscribers via a wired loop plant, the access node comprising:
    a first transmit circuitry including transmit digital processing logic configured to output transmit digital samples serially coupled with digital-to-analog conversion logic configured to convert the transmit digital samples into an analog transmit signal serially coupled with a first transmit output port,
    a plurality of second transmit circuitries individually including a second transmit input port serially coupled with a transmit amplifier configured to amplify a transmit signal serially coupled with a line adaptation unit configured to connect to a transmission line of the wired loop plant and configured to adapt to line physical characteristics of the transmission line,
    wherein the access node further includes a transmit analog switch including a third transmit input port coupled to the first transmit output port, and third transmit output ports coupled to respective ones of the second transmit input ports, and configured to dynamically connect the third transmit input port to one of the third transmit output ports according to a transmit cross-connect table, and
    wherein the access node further includes transmit control logic coupled to the transmit analog switch and configured to update the transmit cross-connect table according to a transmit traffic pattern over the respective transmission lines.

2. The access node according to claim 1, wherein the transmit traffic pattern conforms to a Time-Division Multiple Access (TDMA) scheme.

3. The access node according to claim 1, wherein the transmit traffic pattern is determined according to transmit traffic demands over the respective transmission lines.

4. The access node according to claim 1, wherein the transmit control logic is further configured to individually disable or enable the transmit amplifiers concomitantly with the updating of the transmit cross-connect table.

5. The access node according to claim 1, wherein the first transmit circuitry includes a transmit filter serially coupled between the digital-to-analog conversion logic and the first output port, the transmit filter being configured to confine transmit signal energy into a transmit frequency band.

6. An access node for connecting subscribers via a wired loop plant, the access node comprising:
    a first receive circuitry including a first receive input port serially coupled with analog-to-digital conversion logic configured to convert a receive analog signal into receive digital samples serially coupled with receive digital processing logic configured to process the receive digital samples,
    a plurality of second receive circuitries individually including a line adaptation unit configured to connect to a transmission line of the wired loop plant and configured to adapt to line physical characteristics of the transmission line serially coupled with a receive amplifier configured to amplify a receive signal serially coupled with a second receive output port, wherein the access node further includes a receive analog switch including third receive input ports coupled to respective ones of the second receive output ports, and a third receive output port coupled to the first receive input port, and configured to dynamically connect one of the third receive input ports to the third receive output port according to a receive cross-connect table, and wherein the access node further includes receive control logic coupled to the receive analog switch and configured to update the receive cross-connect table according to a receive traffic pattern over the respective transmission lines.

7. The access node according to claim 6, wherein the receive traffic pattern conforms to a Time-Division Multiple Access (TDMA) scheme.

8. The access node according to claim 6, wherein the receive traffic pattern is determined according to receive traffic demands over the respective transmission lines.

9. The access node according to claim 6, wherein the receive control logic is further configured to individually disable or enable the receive amplifiers concomitantly with the updating of the receive cross-connect table.

10. The access node according to claim 6, where in the first receive circuitry includes a receive filter serially coupled between the first receive input port and the analog-to-digital conversion logic, the receive filter being configured to confine receive signal energy into a receive frequency band.

11. The access node according to claim 1, wherein the transmit cross-connect table of the transmit analog switch is updated independently from a receive cross-connect table.

* * * * *